US009482148B2

(12) United States Patent
Wade et al.

(10) Patent No.: US 9,482,148 B2
(45) Date of Patent: Nov. 1, 2016

(54) ACTIVE EXHAUST PULSE MANAGEMENT

(71) Applicant: Ford Global Technologies, LLC, Dearborn, MI (US)

(72) Inventors: Robert Andrew Wade, Plymouth, MI (US); David Currie, New Hudson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 14/073,766

(22) Filed: Nov. 6, 2013

(65) Prior Publication Data

US 2015/0121862 A1 May 7, 2015

(51) Int. Cl.
| *F02B 33/44* | (2006.01) |
| *F02B 37/22* | (2006.01) |
| *F02B 37/02* | (2006.01) |
| *F02B 37/12* | (2006.01) |

(52) U.S. Cl.
CPC .............. *F02B 37/22* (2013.01); *F02B 37/02* (2013.01); *F02B 37/025* (2013.01); *F02B 37/12* (2013.01); *Y02T 10/144* (2013.01)

(58) Field of Classification Search
CPC ...... F02B 37/22; F02B 37/02; F02B 37/025; F02B 37/12; F02D 41/0007; F02M 25/0709; Y02T 10/144
USPC .......................................................... 60/602
See application file for complete search history.

(56) References Cited

U.S. PATENT DOCUMENTS

| 1,761,960 A * | 6/1930 | Armitage ...................... 123/545 |
| 5,072,583 A | 12/1991 | Urushihara et al. |
| 7,644,586 B2 | 1/2010 | Yamagata |
| 8,417,439 B2 | 4/2013 | Christian et al. |
| 8,479,511 B2 | 7/2013 | Pursifull et al. |
| 8,511,084 B2 | 8/2013 | Ulrey et al. |
| 2006/0070381 A1* | 4/2006 | Parlow ..................... F02B 37/18 60/612 |
| 2010/0037876 A1* | 2/2010 | Robinson .................. 123/65 PE |
| 2011/0061633 A1* | 3/2011 | Robinson ................... 123/559.1 |

(Continued)

FOREIGN PATENT DOCUMENTS

| EP | 0247631 A1 | 12/1987 |
| EP | 1371831 A1 | 12/2003 |
| EP | 1793101 A2 | 6/2007 |

(Continued)

OTHER PUBLICATIONS

Jammoussi, Hassene et al., "Exhaust Gas Sensor Diagnosis and Controls Adaptation," U.S. Appl. No. 13/779,349, filed Feb. 27, 2013, 45 pages.

(Continued)

*Primary Examiner* — Nicholas J Weiss
*Assistant Examiner* — Ngoc T Nguyen
(74) *Attorney, Agent, or Firm* — Julia Voutyras; Alleman Hall McCoy Russell & Tuttle LLP

(57) ABSTRACT

Methods and systems are provided for adjusting a volume control valve attached to a branch of a split exhaust manifold in a boosted engine system. Volume control valve adjustments are used at different engine operating conditions to improve engine performance and boost response. One example method includes closing the volume in response to a tip-in when increased boost is needed for exhaust turbine spool-up.

18 Claims, 8 Drawing Sheets

(56) References Cited

U.S. PATENT DOCUMENTS

2012/0023934 A1     2/2012    Pursifull et al.
2012/0198825 A1     8/2012    Geminn et al.

FOREIGN PATENT DOCUMENTS

WO       2008078020 A1     7/2008
WO       2009106832 A1     9/2009

OTHER PUBLICATIONS

Kragh, Niels Christopher, "System and Method for Gas Purge Control," U.S. Appl. No. 13/852,785, filed Mar. 28, 2013, 31 pages.

Doering, Jeffrey Allen et al., "Method and System for Binary Flow Turbine Control," U.S. Appl. No. 14/053,525, filed Oct. 14, 2013, 96 pages.

Buckland, Julia Helen et al., "Method and System for Binary Flow Turbine Control," U.S. Appl. No. 14/053,536, filed Oct. 14, 2013, 94 pages.

Boyer Brad Alan et al., "Method and System for Binary Flow Turbine Control," U.S. Appl. No. 14/053,540, filed Oct. 14, 2013, 96 pages.

Buckland, Julia Helen et al., "Method and System for Binary Flow Turbine Control," U.S. Appl. No. 14/053,542, filed Oct. 14, 2013, 93 pages.

Buckland, Julia Helen et al., "Method and System for Binary Flow Turbine Control," U.S. Appl. No. 14/053,546, filed Oct. 14, 2013, 93 pages.

Boyer, Brad Alan et al., "Method and System for Binary Flow Turbine Control," U.S. Appl. No. 14/053,550, filed Oct. 14, 2013, 93 pages.

* cited by examiner

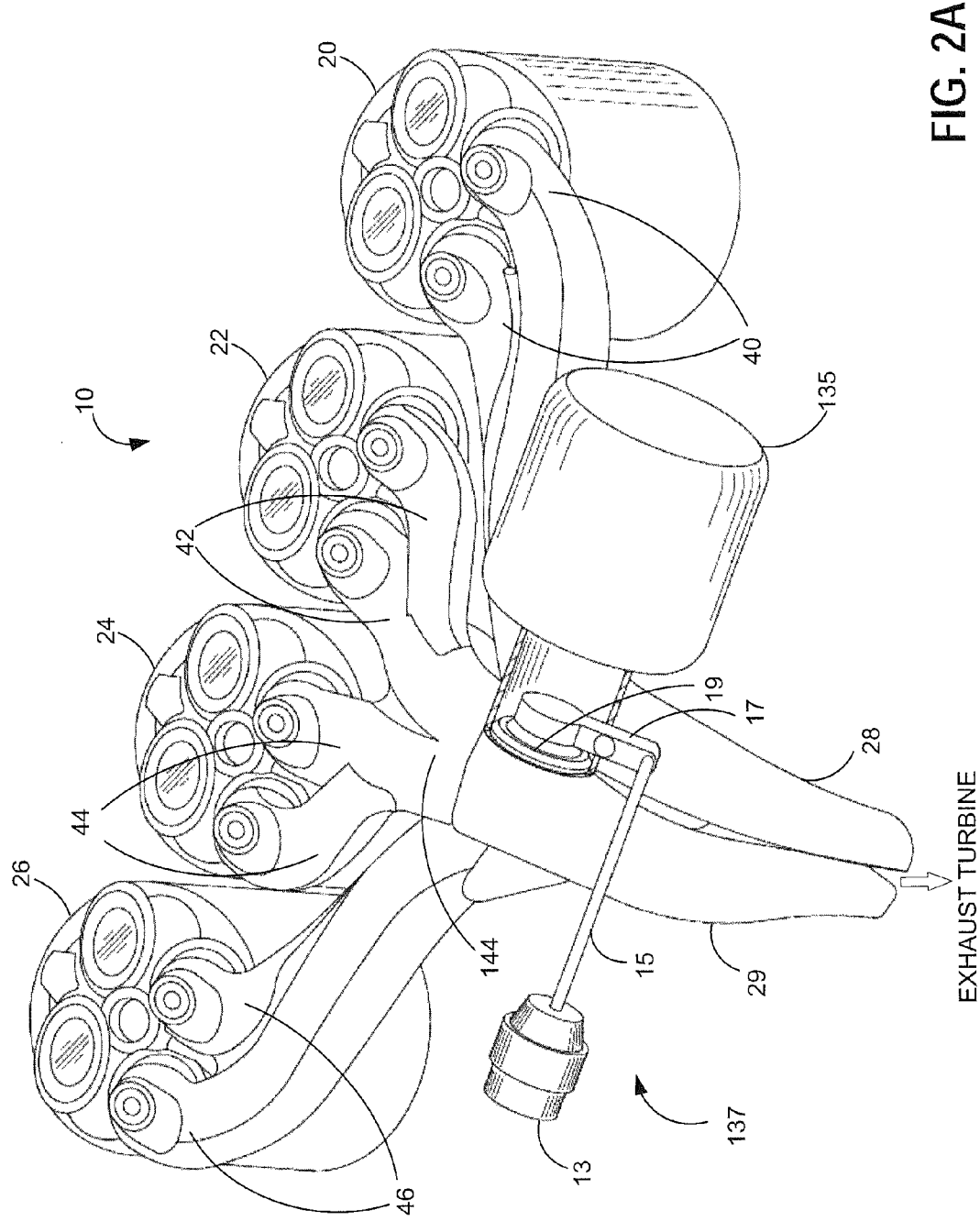

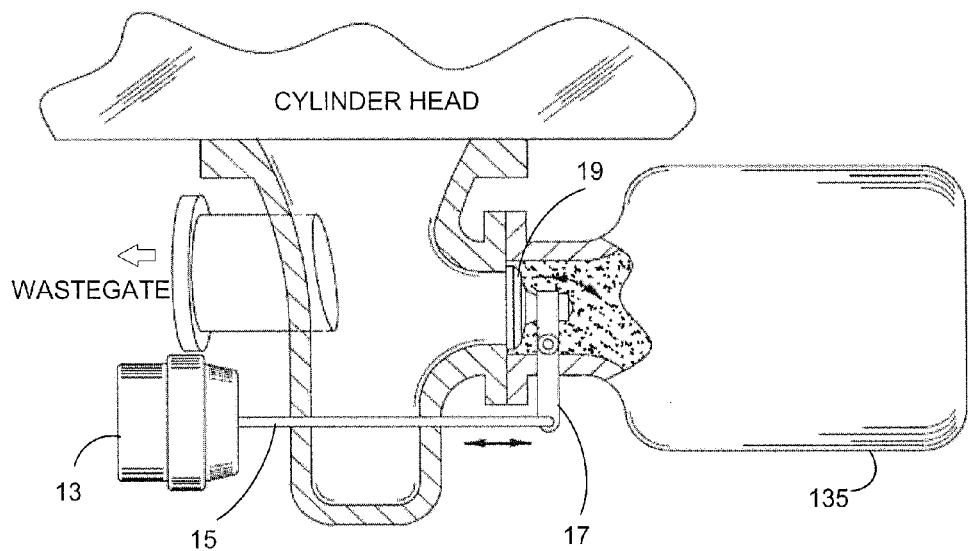
FIG. 2B (PLAN)
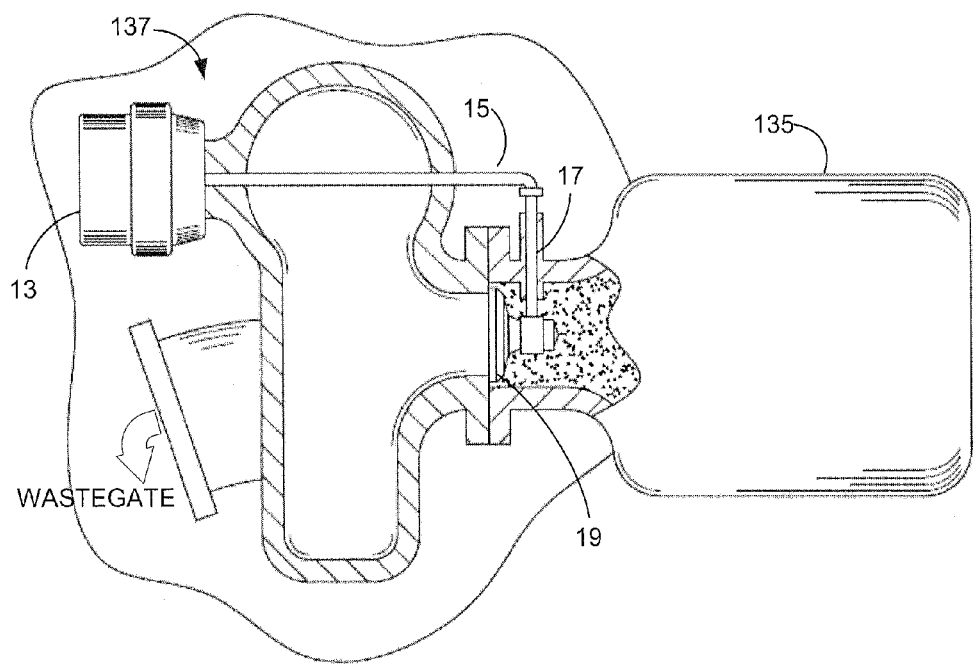
FIG. 2C (ELEVATION)

US 9,482,148 B2

ACTIVE EXHAUST PULSE MANAGEMENT

FIELD

The present application relates to a controlled volume with valve coupled to a split exhaust manifold in a boosted engine system.

BACKGROUND AND SUMMARY

Split exhaust manifolds with pulse separation can be used to deliver higher exhaust pressure to the turbocharger resulting in improved turbocharged engine performance. Separated exhaust paths also prevent the trapping of exhaust gases in adjacent cylinders which may cause misfiring of the cylinder. Diverse approaches may be used to control exhaust manifold pressure and turbine speed at varying operating conditions to regulate boost.

One example approach is shown by Danet et al. in WO 2008/078020 wherein the boosted engine system includes a variable volume exhaust manifold. Therein, exhaust flow is directed via two separate paths to the twin scrolls of the turbocharger to provide boost and engine speed control. The split exhaust pipes are each connected to a storage volume upstream of the turbine and each volume is controlled by a butterfly valve that opens or closes said storage volume based on engine speed. At low engine speed, the storage volumes are closed to preserve exhaust pressure but at high engine speeds, the storage volumes are opened to increase exhaust volume and reduce pumping losses. The valve can also assume a half-closed or half-open position.

The inventors herein have identified potential issues with the above approach. Even though split manifolds offer pulse preservation, depending on the engine speed they may expose exhaust valves to higher pressures under some conditions. For example, even at lower speeds, exhaust pressure pulsations in the split manifold can be sufficiently high to force open the exhaust valves at untimely moments in the combustion cycle. For example, exhaust pressure pulses can generate peak exhaust pressures in the split manifold that are sufficiently high to force open an exhaust valve during an intake stroke of the cylinder, inadvertently admitting exhaust gases into the cylinder. This can have negative consequences, including significant loss of engine power and efficiency, while increasing combustion instability.

The inventors herein have recognized the above issues and identified various approaches to address them.

One approach provides a method, including opening a volume control valve on a split exhaust manifold of an engine responsive to engine operating conditions, but closing the volume responsive to an operator tip-in. For example, even though engine speed conditions may dictate an open valve for desired steady-state engine efficiency, the increased responsiveness of turbocharger spool-up obtained with a closed valve position may provide desired operator performance. Thus, by at least temporarily closing the valve during such transient conditions, improved performance can be achieved. Once through the transient (e.g., after the boost level has reached a threshold), the valve can be returned to its desired position based on engine speed.

Likewise, even though engine speed conditions may dictate a closed valve for desired steady-state engine efficiency, the increased peak exhaust backpressure may cause an exhaust valve of one of the cylinders communicating with the exhaust to inadvertently open during an intake stroke. Thus, by at least temporarily opening the volume control valve during such conditions, degraded combustion performance can be reduced. Once peak exhaust back-pressures recede, the valve can be returned to its desired position based on engine speed in order to preserve exhaust pulses for efficiently driving the turbocharger. In this way, it is possible to balance a system efficiently while reducing inadvertent opening of exhaust valves.

In another embodiment, a method includes, during a transient increase in torque demand (e.g., a pedal tip-in), where the torque request increases beyond a threshold and a boost pressure above a threshold is commanded, the volume control valve may be closed independent of other engine conditions (e.g., higher exhaust pressure causing untimely opening of exhaust valves) to provide increased pressure exhaust pulses to the turbocharger. On the other hand, if boost pressure is already sufficiently high and the higher exhaust pressure is present, the volume control valve can be opened to decrease exhaust peak exhaust pressure and reduce the inadvertent opening of the exhaust valves.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A depicts a controlled volume attached to the exhaust pipe connected to exhaust ports of cylinders 2 and 3.

FIGS. 2B and 2C are detailed diagram of the volume with a control valve. FIG. 2B is the plan view and FIG. 2C is the elevation view.

DETAILED DESCRIPTION

Figure 1:
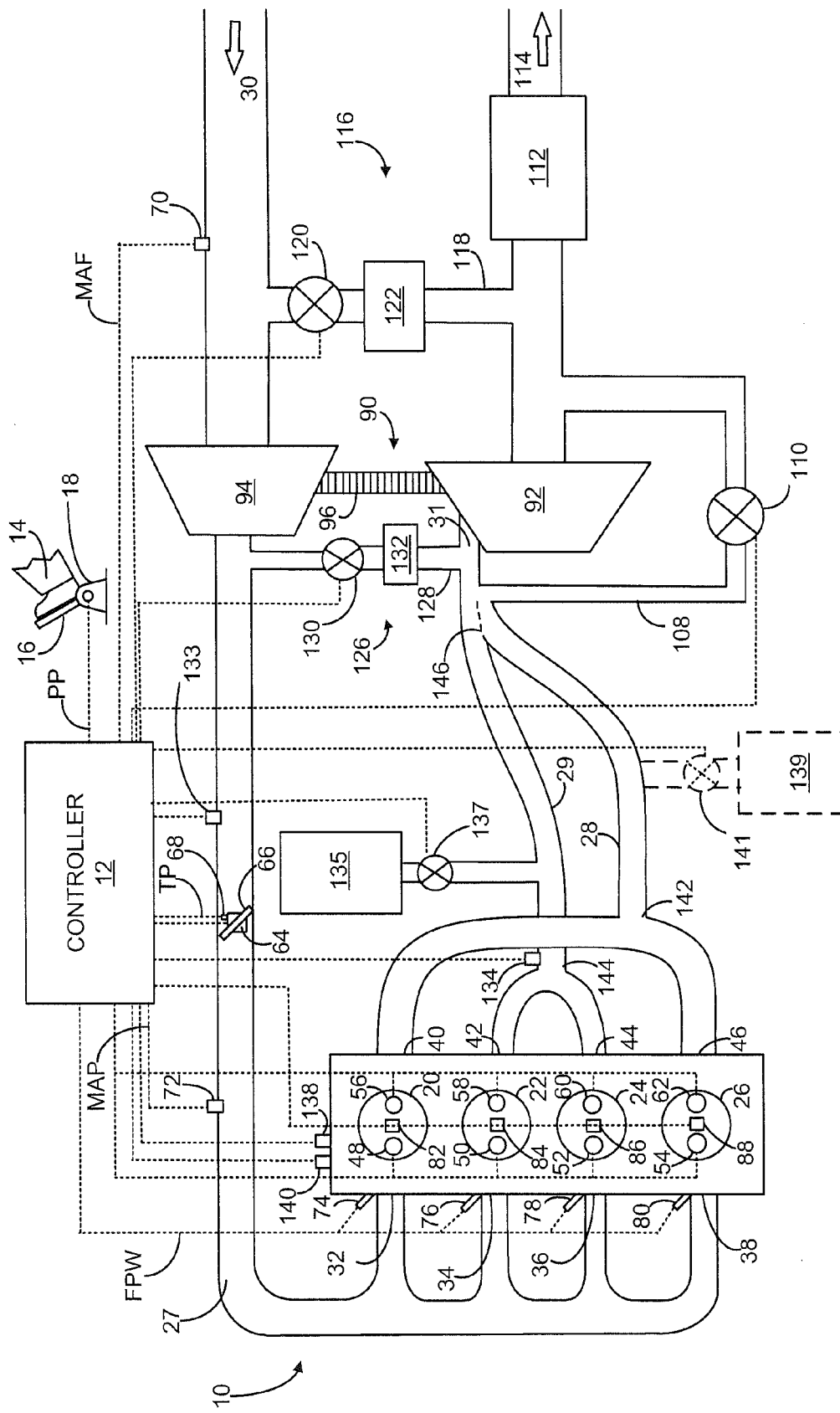
FIG. 1 shows a schematic diagram of a turbocharged engine system with a split exhaust manifold and an exhaust gas recirculation (EGR) system.
Figure 5:
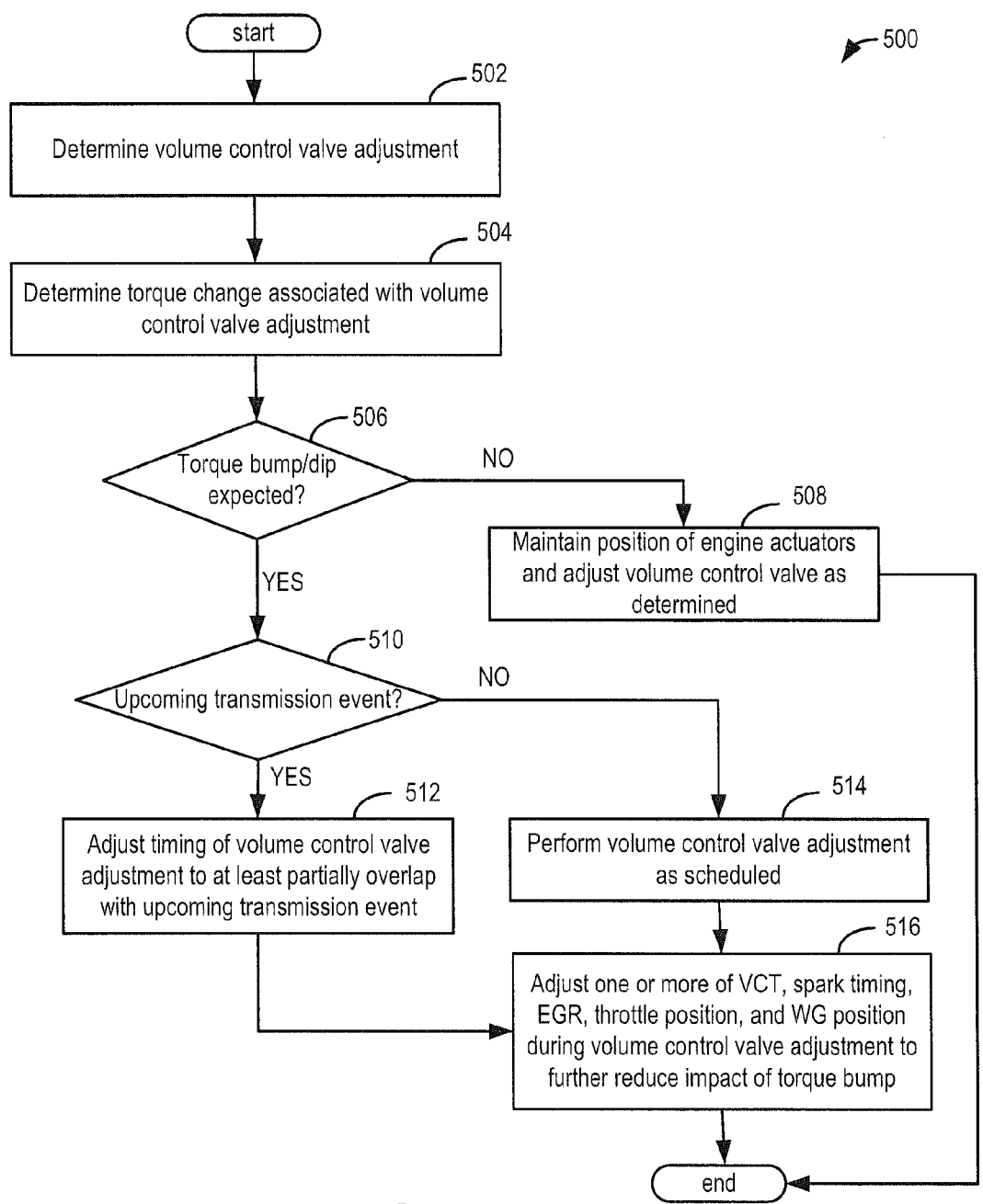
Figure 6:
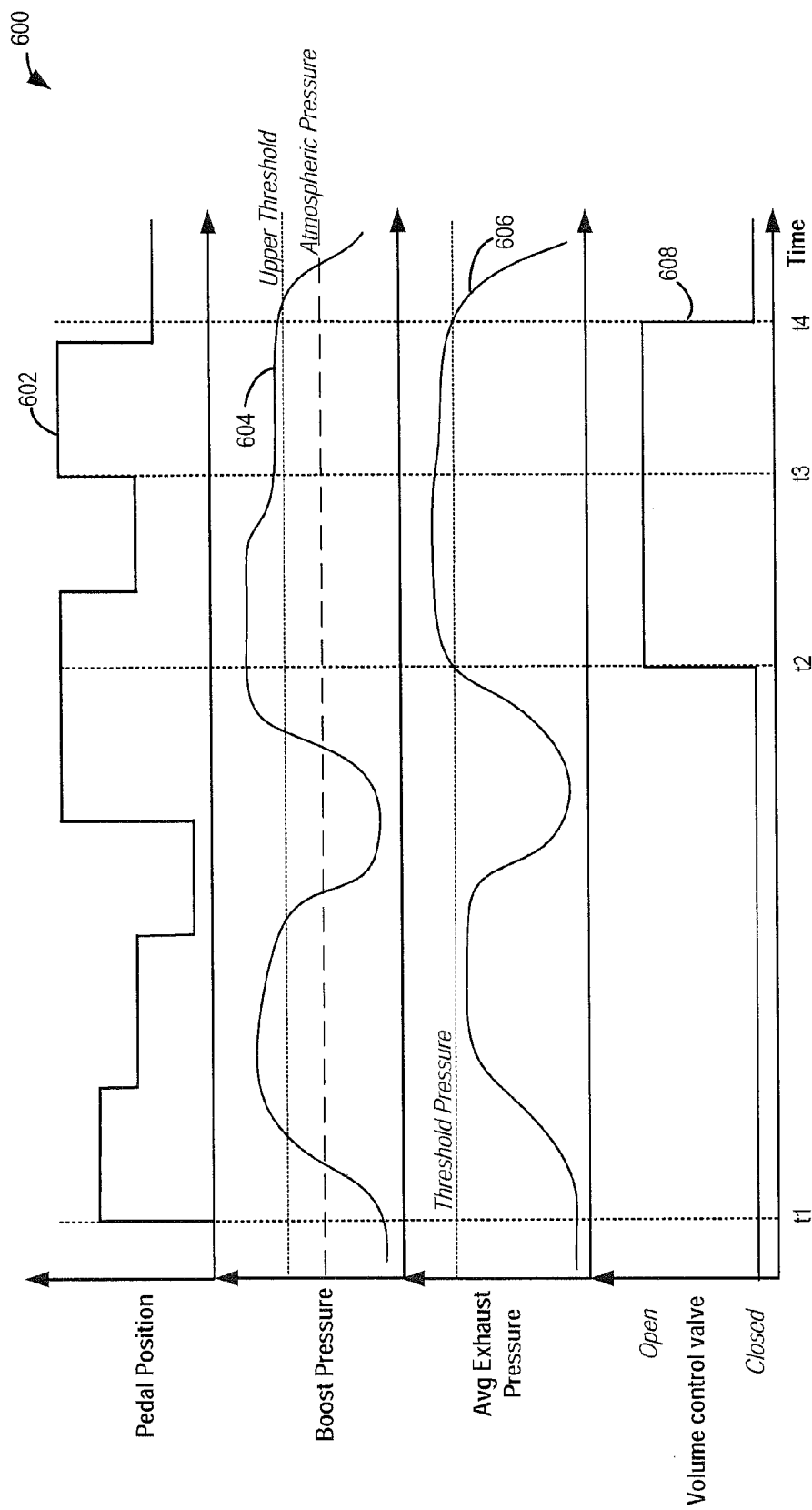
FIG. 6 illustrates the operation of the volume control valve in response to tip-in and exhaust pressure.
Figure 7:
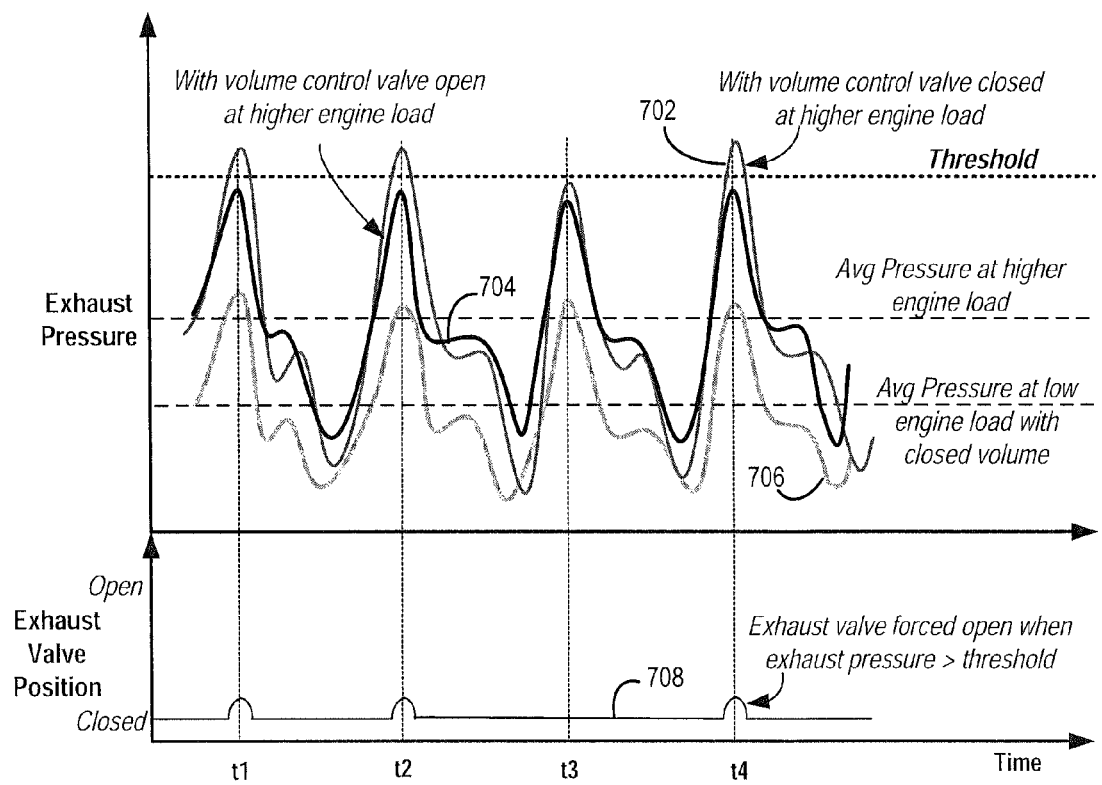
FIG. 7 shows the effect of high exhaust pressure on exhaust valves and the reduction in exhaust pressure peaks when volume control valve is open.

The following description relates to systems and methods for operating a boosted engine with a split exhaust manifold and an exhaust gas recirculation (EGR) system, as shown in FIG. 1. A controlled volume is attached to the exhaust pipe from cylinders 2 and 3 as shown in FIG. 2A. This volume can be opened or closed by a valve, as shown in FIGS. 2B and 2C, depending on the exhaust pressure in the manifold. A controller may be configured to perform a routine, such as the routine of FIG. 3, to adjust the position of this valve (such as from an initial position) based on various engine operating conditions. For example, the volume control valve position may be adjusted based on engine startup, tip-ins, presence of knocking or DFSO. The valve position may be adjusted during torque transients (FIG. 4), such as a tip-in, to reduce turbo lag. Torque disturbances associated with the opening or closing of the controlled volume may be compensated for using concomitant adjustments to one or more engine actuators (FIG. 5). Example volume control valve adjustments based on exhaust pressure and engine operating conditions are shown in FIGS. 6 and 7.

FIG. 1 shows a schematic diagram of an engine 10, which may be included in a propulsion system of an automobile. Engine 10 may be controlled at least partially by a control system including controller 12 and by input from a vehicle operator 14 via an input device 16. In this example, input device 16 includes an accelerator pedal and a pedal position sensor 18 for generating a proportional pedal position signal PP. In some examples, controller 12 may be a microcomputer including: a microprocessor unit, input/output ports, read-only memory, random access memory, keep alive memory, and a conventional data bus.

Engine 10 may include a plurality of combustion chambers (i.e., cylinders) which may be capped on the top by a cylinder head (not shown). In the example shown in FIG. 1, engine 10 includes combustion chambers 20, 22, 24, and 26, arranged in an inline-4 configuration. It should be understood, however, that though FIG. 1 shows four cylinders, engine 10 may include any number of cylinders in any configuration, e.g., V-6, I-6, V-12, opposed 4, etc.

Though not shown in FIG. 1, each combustion chamber (i.e., cylinder) of engine 10 may include combustion chamber walls with a piston positioned therein. The pistons may be coupled to a crankshaft so that reciprocating motions of the pistons are translated into rotational motion of the crankshaft. The crankshaft may be coupled to at least one drive wheel of a vehicle via an intermediate transmission system, for example. Further, a starter motor may be coupled to the crankshaft via a flywheel to enable a starting operation of engine 10.

Each combustion chamber may receive intake air from an intake manifold 27 via an air intake passage 30. Intake manifold 27 may be coupled to the combustion chambers via intake ports. For example, intake manifold 27 is shown in FIG. 1 coupled to cylinders 20, 22, 24, and 26 via intake ports 32, 34, 36, and 38 respectively. Each respective intake port may supply air and/or fuel to the respective cylinder for combustion.

Each combustion chamber may exhaust combustion gases via an exhaust port coupled thereto. For example, exhaust ports 40, 42, 44 and 46, are shown in FIG. 1 coupled to cylinders 20, 22, 24, 26, respectively. This being a split manifold, exhaust ports 40 and 46 lead into a separate exhaust manifold 28 while exhaust ports 42 and 44 combine into an external exhaust pipe housing passage 29, the external exhaust manifold external to the cylinder head. The two exhaust passages 28 and 29, both formed in the external exhaust pipe, later merge into one exhaust pipe 31 connected to turbine 92 of turbocharger 90. In an alternative embodiment, the exhaust pipe formed may be completely or partially integrated in the cylinder head.

Each cylinder intake port can selectively communicate with the cylinder via an intake valve. For example, cylinders 20, 22, 24, and 26 are shown in FIG. 1 with intake valves 48, 50, 52, and 54, respectively. Likewise, each cylinder exhaust port can selectively communicate with the cylinder via an exhaust valve. For example, cylinders 20, 22, 24, and 26 are shown in FIG. 1 with exhaust valves 56, 58, 60, and 62, respectively. In some examples, each combustion chamber may include two or more intake valves and/or two or more exhaust valves.

Though not shown in FIG. 1, in some examples, each intake and exhaust valve may be actuated by an intake cam and an exhaust cam. Alternatively, one or more of the intake and exhaust valves may be operated by an electromechanically controlled valve coil and armature assembly. The position of an intake cam may be determined by an intake cam sensor. The position of exhaust cam may be determined by an exhaust cam sensor.

Intake passage 30 may include a throttle 64 having a throttle plate 66. In this particular example, the position of throttle plate 66 may be varied by controller 12 via a signal provided to an electric motor or actuator included with throttle 64, a configuration that is commonly referred to as electronic throttle control (ETC). In this manner, throttle 64 may be operated to vary the intake air provided the combustion chambers. The position of throttle plate 66 may be provided to controller 12 by throttle position signal TP from a throttle position sensor 68. Intake passage 30 may include a mass air flow sensor 70 and a manifold air pressure sensor 72 for providing respective signals MAF and MAP to controller 12.

In FIG. 1, fuel injectors are shown coupled directly to the combustion chambers for injecting fuel directly therein in proportion to a pulse width of a signal FPW received from controller 12 via an electronic driver, for example. For example, fuel injectors 74, 76, 78, and 80 are shown in FIG. 1 coupled to cylinders 20, 22, 24, and 26, respectively. In this manner, the fuel injectors provide what is known as direct injection of fuel into the combustion chamber. Each respective fuel injector may be mounted in the side of the respective combustion chamber or in the top of the respective combustion chamber, for example. In some examples, one or more fuel injectors may be arranged in intake manifold 27 in a configuration that provides what is known as port injection of fuel into the intake ports upstream of the respective combustion chambers. Though not shown in FIG. 1, fuel may be delivered to the fuel injectors by a fuel system including a fuel tank, a fuel pump, a fuel line, and a fuel rail.

In some examples, a distributorless ignition system (not shown) may provide an ignition sparks to spark plugs coupled to the combustion chambers in response to controller 12. For example, spark plugs 82, 84, 86, and 88 are shown in FIG. 1 coupled to cylinders 20, 22, 24, and 26, respectively.

Engine 10 may include a turbocharger 90. Turbocharger 90 may include an exhaust turbine 92 and an intake compressor 94 coupled on a common shaft 96. Turbine 92 may be configured to receive separate exhaust gas from cylinders whose exhaust gas pulses interfere with each other when supplied to turbine 92. For example, if a four-cylinder engine (e.g., an I4 engine such as shown in FIG. 1) has a firing sequence of 1-3-4-2 (e.g., cylinder 20 followed by cylinder 24 followed by cylinder 26 followed by cylinder 22), then cylinder 20 may be ending its expansion stroke and opening its exhaust valves while cylinder 22 still has its exhaust valves open. In an undivided exhaust manifold, the exhaust gas pressure pulse from cylinder 20 may interfere with the ability of cylinder 22 to expel its exhaust gases. However, by using a split manifold wherein exhaust ports 40 and 46 from cylinders 20 and 26 are connected to first exhaust manifold 28 and exhaust ports 42 and 44 from cylinders 22 and 24 are connected to a second exhaust manifold 29, exhaust pulses may be separated to preserve high pulse energy and improve the turbine performance. Exhaust manifolds 28 and 29 are maintained completely separate upstream of their Y-junction 146 reducing any interference of exhaust pulses and delivering distinct pulses into exhaust turbine 92.

The second exhaust manifold 29 may include a volume 135 with a control valve 137 which is opened or closed based on exhaust pressure estimated by controller 12 in second exhaust manifold 29. Volume 135 is attached to manifold 29 downstream of Y-junction 144 but upstream of exhaust turbine 92. The volume is an enclosed chamber with only one outlet that is controlled by valve 137. Volume 135 being coupled to second exhaust manifold 29 exclusively communicates with cylinders 22 and 24 and exhaust valves 58 and 60, respectively. Another embodiment may include a similar volume 139 with a second control valve 141 attached to first exhaust manifold 28. Herein, volume 139 exclusively communicates with exhaust valves 56 and 62 of cylinders 20 and 26, respectively. Thus, each exhaust manifold can include a controllable volume with controlling valve where each volume is controlled independently based on the exhaust pressure thresholds in the exhaust manifolds they are coupled to. For example, one manifold may be able to tolerate the valve being held closed at higher boost levels without the exhaust valve popping open, as compared to the other.

In another embodiment, volume 135 may be formed within an integrated exhaust manifold with manifold 29 (and 28) therein as well.

In the following description, the engine has only one volume 135 controlled by valve 137 attached to second exhaust manifold 29. However, the approaches described herein can be duplicated for a second volume and a second control valve (139/141) coupled to the other exhaust manifold.

A wastegate 110 may be coupled across turbine 92. Specifically, wastegate 110 may be included in a bypass 108 coupled between an inlet and outlet of the exhaust turbine. By adjusting a position of wastegate 110, an amount of boost provided by the turbine may be controlled.

Exhaust gases exiting turbine 92 and/or wastegate 110 may pass through an emission control device 112. Emission control device 112 can include multiple catalyst bricks, in one example. In another example, multiple emission control devices, each with multiple bricks, can be used. In some examples, emission control device 112 may be a three-way type catalyst. In other examples, emission control device 112 may include one or a plurality of a diesel oxidation catalyst (DOC), and a selective catalytic reduction catalyst (SCR). After passing through emission control device 112, exhaust gas may be directed to a tailpipe 114.

Engine 10 may include one or more exhaust gas recirculation (EGR) systems for recirculating an amount of exhaust gas exiting engine 10 back to the engine intake. For example, engine 10 may include a first, low pressure EGR (LP-EGR) system 116 for recirulating a portion of exhaust gas from the exhaust manifold to the intake manifold, specifically, from the engine exhaust, downstream of turbine 92, to the engine intake, upstream of intake compressor 94. The LP-EGR system may include a LP-EGR conduit 118, a LP-EGR valve 120 configured to control an amount of exhaust gas recirculated along LP-EGR conduit 118, and a LP-EGR cooler 122 for cooling the exhaust gas before delivery to the intake.

Engine 10 may also include, additionally or separately, a high pressure EGR (HP-EGR) system 126 for recirculating a portion of exhaust gas from the exhaust manifold to the intake manifold, specifically, from the engine exhaust, upstream of turbine 92, to the engine intake, downstream of compressor 94. The HP-EGR system may include a HP-EGR conduit 128, a HP-EGR valve 130 configured to control an amount of exhaust gas recirculated along HP-EGR conduit 128, and a HP-EGR cooler 132 for cooling the exhaust gas before delivery to the intake.

Under some conditions, one or more of EGR systems 116 and 126 may be used to regulate the temperature and or dilution of the air and fuel mixture within the combustion chambers, thus providing a method of controlling the timing of ignition during some combustion modes. Further, during some conditions, a portion of combustion gases may be retained or trapped in the combustion chamber by controlling exhaust valve timing.

In some examples, controller 12 may be a microcomputer including: a microprocessor unit, input/output ports, read-only memory, random access memory, keep alive memory, and a conventional data bus. Controller 12 is shown in FIG. 1 receiving various signals from sensors coupled to engine 10, in addition to those signals previously discussed, including: engine coolant temperature (ECT) from a temperature sensor 138; an engine position sensor 140, e.g., a Hall effect sensor sensing crankshaft position. Barometric pressure may also be sensed (sensor not shown) for processing by controller 12. In some examples, engine position sensor 140 produces a predetermined number of equally spaced pulses every revolution of the crankshaft from which engine speed (RPM) can be determined. Additionally, various sensors may be employed to determine turbocharger boost pressure. For example, a pressure sensor 133 may be disposed in the engine intake downstream of compressor 94 to determine boost pressure. Additionally, at least the second exhaust manifold 29 may include various sensors for monitoring exhaust conditions such as an exhaust gas sensor 134. Exhaust gas sensor 134 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Based on the input from the various sensors, controller 12 may be configured to perform various control routines (such as those described with reference to FIGS. 3-5) and actuate one or more engine actuators. The actuators may include, for example, intake throttle 64, wastegate 110, and volume control valve 137.

FIG. 2A depicts volume 135 with control valve 137 as attached to second exhaust manifold 29. The exhaust manifolds in this system may be integrated into a cylinder head and configured to exhaust the combustion products from cylinders 20, 22, 24 and 26. Each cylinder may include two exhaust valves for channeling the blowdown and scavenging portions of the combustion gases separately into exhaust ports 40, 42, 44, and 46. Thus, each exhaust port has two branches that selectively communicate with the exhaust valves.

This being a split manifold, exhaust runners connected to ports 40 and 46 from cylinders 20 and 26 merge into first exhaust manifold 28 and exhaust runners coupled to ports 42 and 44 from cylinders 22 and 24 merge into a second exhaust manifold 29 at Y-junction 144. The first and second exhaust manifolds do not communicate, and similarly, the exhaust runners coupled to cylinders in different subsets do not communicate. As such, exhaust pulses from cylinders in different subsets may be separated, such that blowback from one cylinder may not interfere with combustion in another cylinder adjacent in the firing sequence. In an integrated exhaust manifold, piping from the first and second exhaust manifolds 28 and 29 may extend outside of the integrated exhaust manifold and merge upstream of the exhaust turbine.

FIGS. 2B and 2C show more detailed figures of the volume and its valve. Volume control valve 137 comprises an actuator 13, a connecting rod 15 that moves swivel arm 17 which in turn actuates valve flap 19 to open and close the entrance to volume 135. In some examples, the actuator may be a vacuum actuator coupled to a vacuum regulator valve that is directed by controller 12. Valve flap 19 may be closed or opened based on signals from a controller which adjusts this position depending on engine operating conditions and based on whether the turbocharger is to provide more boost, as described herein.

In one example, actuator 13 may control the valve via a shaft extending across the exhaust passage, optionally through an internal hole of the passage that is physically separated from the exhaust passage and which does not communicate with the exhaust passage. Such positioning may reduce the heat loading on the actuator.

Note that FIGS. 2A-2C are drawn approximately to scale, although other relative dimensions may be used, if desired.

Figure 3:
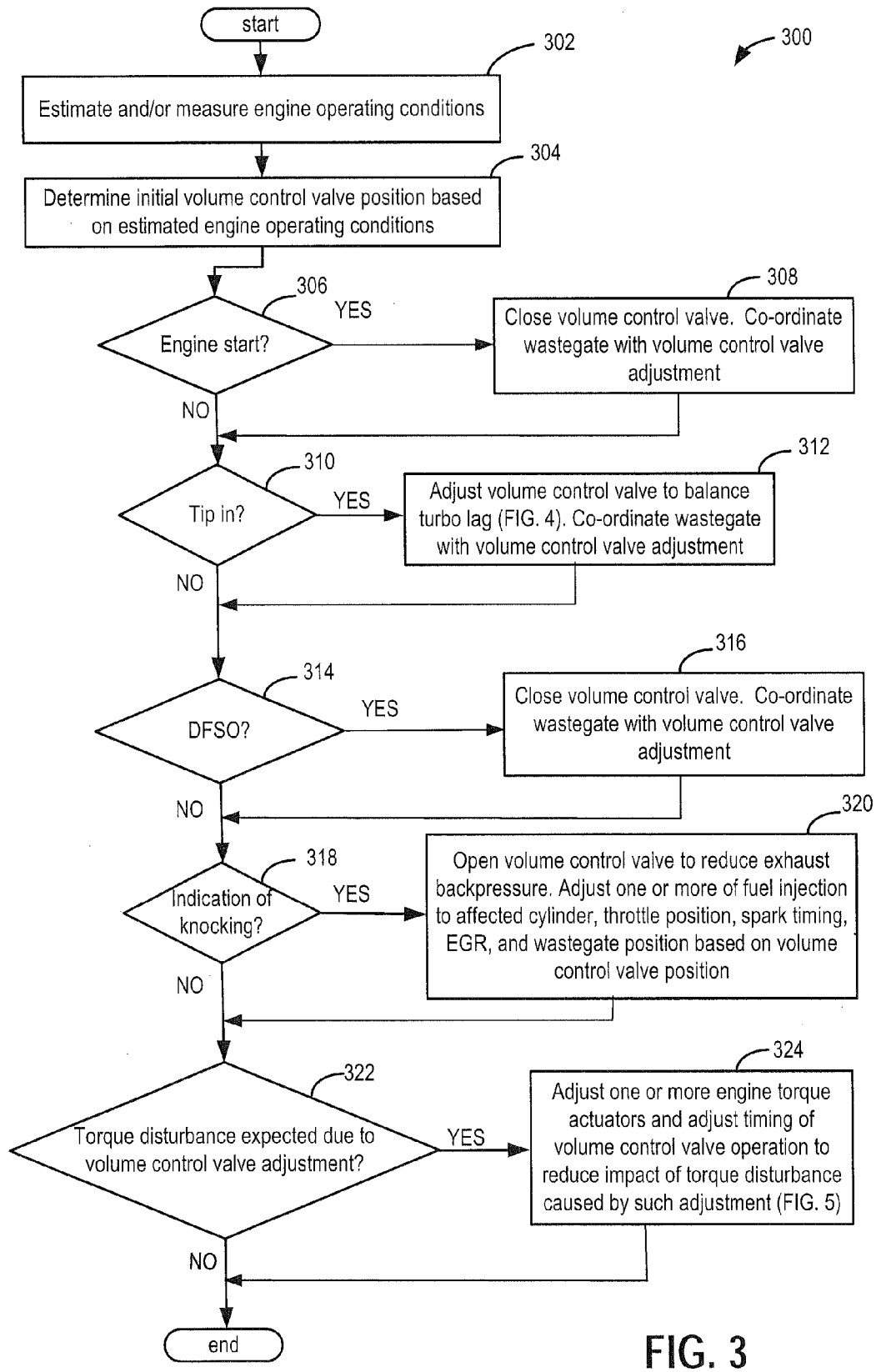
FIGS. 3-5 depict example flowcharts for adjusting the position of a volume control valve based on various engine operating conditions.

A sample routine that may be performed by controller 12 is shown at FIG. 3. Specifically, the routine may determine an initial volume control valve position and then based on engine operating conditions, including based on engine limitations, transients, etc., the valve position may be further modified via the specific routines and sub-routines of FIGS. 3-5. The routine may further enable wastegate adjustments and EGR valve adjustments (including HP-EGR and LP-EGR adjustments) to be coordinated with the volume control valve adjustments to improve engine performance and torque output.

At 302, the routine includes estimating and/or measuring engine operating conditions. These may include, for example, engine speed, torque demand, catalyst temperature, engine temperature, exhaust air-fuel ratio, MAP, MAF, barometric pressure, etc. At 304, based on the estimated engine operating conditions, an initial volume control valve position may be determined. For example, at steady state conditions, if engine speed is over a threshold resulting in higher exhaust pressure in the exhaust manifold, the volume control valve may be opened to reduce pumping losses. If the engine speed is below a threshold speed and exhaust pressure is below an acceptable limit, the volume control valve is closed. At 306, it may be determined if engine start conditions are present. These conditions may be cold-start or hot-start. An engine start may include cranking the engine from rest via a motor, such as a starter motor. In order to speed exhaust turbine spool-up in a turbocharged system in preparation for tip-in, the exhaust pressure can be increased rapidly. To enable this, the volume control valve may be temporarily closed, at least during an early part of an engine start, to raise the exhaust manifold pressure and expedite turbine spool-up.

If engine start conditions are present, then at 308 the routine will close the volume control valve to provide high exhaust pressure to turbocharger. Wastegate adjustments may be coordinated with, and based on, the corresponding volume control valve movements.

After an engine start has been completed (hot start or cold start), the routine proceeds to 310 where it may be determined if there are any transients. For example, it may be determined if there is a sudden increase in torque demand (e.g., due to a tip-in). If yes, then at 312, the routine includes adjusting the volume control valve based on the transient conditions to meet the transient torque demand. As FIG. 4 will elaborate, this may depend on boost pressure and exhaust pressure. Wastegate adjustments may be coordinated with, and based on, the corresponding volume control valve adjustments.

At 314, it may be determined if deceleration fuel shut-off (DFSO) conditions have been met. The DFSO event may be in response to torque demand being lower than a threshold, such as during a tip-out. Therein, cylinder fuel injection may be selectively stopped. In an alternate example, where the engine is configured to be selectively deactivated in response to idle-stop conditions, engine deactivation may be confirmed in response to an idle-stop operation being performed where cylinder fuel injection is deactivated while spark is also deactivated. If a DFSO is confirmed, then at 316, the routine closes or maintains closed the volume control valve. The wastegate schedule and position will be based on the indication of DFSO to increase turbine speed and improve responsiveness to the next tip-in.

At 318 it may be determined if there is any indication of engine knock. If yes, then at 320, the routine includes opening the volume control valve to reduce exhaust pressure. As such, engine knock may be due to an abnormal combustion event occurring in a cylinder after a spark ignition event of the cylinder. This can lead to high pressure in the cylinder and therefore, higher exhaust pressure. Based on other engine conditions and the presence of knocking, the controller may open the volume control valve to allow for pressure dissipation. Conversely, inadvertent admission of exhaust gas into engine cylinders may initiate engine knock, and as such opening of the volume control valve can not only reduce the inadvertent admission of exhaust gas, but also the resulting engine knock.

Continuing with FIG. 3, the routine includes further adjusting one or more of VCT, throttle position, spark timing, cylinder fueling and EGR delivered to the knock-affected cylinder, the adjustment based on the volume control valve position. As such, these may include actuator adjustments used to address knock. For example, in response to the indication of knock, spark timing may be retarded, with the amount of spark retard applied based on the opening of the volume control valve.

At 322, it may be determined if a torque disturbance is expected due to the volume control valve adjustments (such as due to any of the prior valve adjustments at 308-320). If yes, then at 324, the routine includes adjusting one or more engine torque actuators to reduce the impact of the imminent torque disturbance. By adjusting the timing of volume control valve operation, the torque disturbance may be better masked, improving the vehicle operator's drive feel. In one example, the timing of the volume control valve adjustment can be made to partially overlap a transmission event to reduce the impact of the torque bump, thereby improving driveability. Example torque actuator adjustments and volume control valve timing adjustments performed to mask torque disturbances are described with reference to FIG. 5.

In this way, by using volume control valve adjustments, alone or in combination with wastegate and EGR valve adjustments, a range of engine operation over which boost benefits can be provided is enhanced. Overall, engine performance is enhanced while also improving fuel economy.

Figure 4:
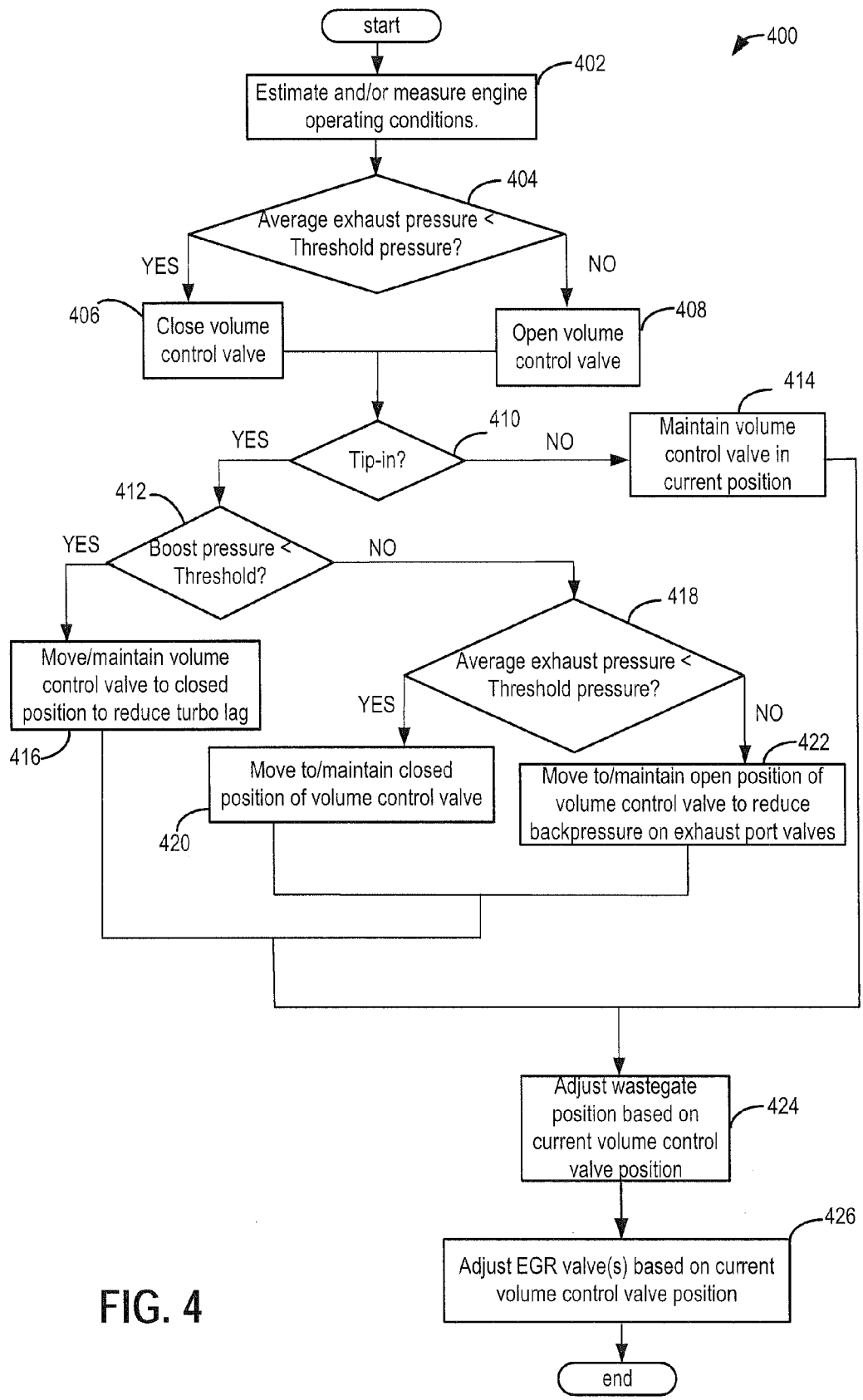

Now turning to FIG. 4, an example routine 400 that may be performed during an increased torque demand, such as following a tip-in, is shown. This approach allows turbo lag to be reduced.

At 402, the routine includes estimating and/or measuring engine operating conditions such as engine speed, engine coolant temperature, exhaust catalyst temperature, torque demand, BP, MAP, MAF, etc. At 404, the routine checks to see if the average exhaust pressure in manifold 29 is below a threshold pressure. The average exhaust pressure is estimated based on engine RPM, airflow, boost pressure and other parameters. If the exhaust pressure is below the threshold, at 406, the volume control valve is closed to allow high pressure into the turbocharger 90. If the exhaust pressure is above the threshold, at 408, the volume control valve is opened to reduce exhaust pressure and prevent exhaust valves in cylinders 22 and 24 being forced open.

At 410, a tip-in may be confirmed. For example, it may be determined if the torque demand has increased by more than a threshold amount within a threshold time, and/or whether an accelerator pedal has been depressed by more than a threshold amount. Tip in may be a tip-in from idle conditions (e.g., with pedal at substantially released position) or from steady-state cruising conditions (e.g., with pedal partially depressed). If tip-in conditions are not confirmed, at 414, the routine includes leaving the volume control valve in its current position, as determined at 406 or 408. Further still, residuals may be recirculated from the engine exhaust to the engine intake via the EGR system(s), with the valves adjusted to settings determined at 402, to meet the torque demand. This includes adjusting an LP-EGR valve if the engine system includes an LP-EGR system and an HP-EGR valve if the engine system includes an HP-EGR system to provide the determined amount of exhaust gas recirculation.

If a tip-in is confirmed, then at 412, the routine performs a check on boost pressure levels. If boost pressure is less than a threshold, at 416, the volume control valve is closed to reduce turbo lag and enhance boost pressure possibly at the cost of high exhaust pressure. Thus, the valve may be closed even if exhaust pressure is greater than the threshold level to speed up the turbocharger and raise boost pressure in response to the tip-in. If the boost pressure is already above the threshold, the routine performs another check on exhaust pressure level at 418. If the exhaust pressure is below the threshold exhaust pressure, the volume control valve is closed (or maintained closed) at 420. If the exhaust pressure is above the threshold level, the volume control valve is opened (or maintained at open) at 422 to reduce pressure on exhaust valves.

Further, at 424, a position of a wastegate coupled across the exhaust turbine may be adjusted based on the given volume control valve position in response to the tip-in or the engine torque demand estimated at 402. By closing the wastegate, exhaust manifold pressure can be further increased. For example, the wastegate may be moved towards a fully closed position when boost pressure is below the threshold and when the volume control valve is closed. Alternatively, when the exhaust pressure in the manifold is high enough to force open the exhaust valves 58 and 60 and the volume control valve is in an open position, the wastegate valve may also be opened to divert more of the exhaust gases away from the manifold and allow a further decrease in exhaust pressure. This may occur only if the boost pressure is already above the needed threshold.

At 426, the routine includes adjusting an amount of exhaust gas recirculated to the engine intake. Specifically, an amount of EGR may be reduced as the volume control valve is in fully closed position. In some embodiments, the engine may include an EGR system having an LP-EGR valve in an LP-EGR passage for recirculating exhaust gas from the exhaust manifold, downstream of the turbine, to the intake, upstream of the compressor, as well as an HP-EGR valve in an HP-EGR passage for recirculating exhaust gas from the exhaust manifold, from upstream of the turbine, to the intake manifold, downstream of the throttle. The engine controller may adjust each of the LP-EGR valve and the HP-EGR valve in response to the tip-in to vary a ratio of HP-EGR to LP-EGR based on the volume control valve closing. As one example, the controller may increase an opening of the LP-EGR valve while decreasing an opening of the HP-EGR valve to increase a ratio of LP-EGR to HP-EGR. In another example, the controller may decrease the opening of each of the LP-EGR valve and the HP-EGR valve to reduce engine dilution.

In this way, adjustments to the volume control valve can be made based upon engine speed as well as tip-in conditions and exhaust pressure in the manifold. For example, when engine speed is determined to be above a threshold, the volume control valve may be opened to reduce pumping losses. This position, though, can be overridden under conditions of a tip-in. For example, even if the valve has been opened based on engine speed, it may be temporarily closed in response to a tip-in. Once the necessary boost has been achieved, the valve position may then be adjusted according to engine speed during steady-state conditions. Similarly, an initial valve position may be based upon the engine speed being below a threshold speed when the volume control valve is closed. However, this position may be overruled by high exhaust pressure in the exhaust manifold. The valve may be opened in such a situation to limit the exposure of exhaust valves to high pressure even if engine speed is below the threshold and when boost pressure is above the necessary threshold.

An example volume control valve adjustment is now described with reference to FIG. 6. Map 600 of FIG. 6 depicts the conditions under which the volume control valve will be opened or closed, in particular, a tip-in. Map 600 depicts pedal position at plot 602, boost pressure at plot 604, average exhaust pressure at plot 606 and volume control valve adjustments at plot 608. All plots are depicted over time, plotted along the x-axis.

Prior to t1, the engine may be operating at idle or in steady-state mode with engine speed below a threshold speed and with the volume control valve (plot 608) closed. At t1, a tip-in event may be confirmed. At the same time, boost pressure is less than the upper threshold indicating the need for turbocharger spool up. Plot 606 shows that the average exhaust pressure in exhaust manifold 29 is less than the threshold at t1. In response to the tip-in event and boost condition, the volume control valve remains closed. By keeping the volume closed in response to a tip-in, the exhaust manifold pressure can be rapidly increased, thereby enabling the turbine to quickly spin-up. As such, this reduces turbo lag and allows transients to be better addressed. In the depicted example, the valve is maintained closed from t1 to t2. At t2, when the boost pressure is sufficiently high (e.g., above the upper threshold) and the exhaust pressure rises above its threshold limit, the volume control valve is opened to dampen the high exhaust pressure pulses.

At t3, another tip-in event may be confirmed but boost pressure and exhaust pressure are now above the upper limit. In response to sufficient boost pressure and high exhaust pressure, the volume control valve is maintained at open position. At t4, as average exhaust pressure falls below the threshold, the volume control valve is closed in response. While not depicted in the example of FIG. 6, in further examples, a controller may adjust various engine torque actuators, such as one or more of spark ignition timing, VCT, valve overlap, and an intake throttle position based on the volume control valve adjustment and the torque transients.

In this way, volume control valve adjustments may be performed responsive to transient torque demands, boost pressure and high exhaust pressure. While engine speed may be used as one baseline for opening or closing the volume control valve during steady-state conditions, this parameter can be overridden during transient conditions, such as tip-ins (e.g., when an open volume control valve may be closed to expedite turbine spin-up), and also during conditions where the exhaust pressure may be too high (e.g., when a closed volume control valve may be opened except for a tip-in) to minimize the accidental opening of exhaust valves. Thus, engine speed may be substantially unchanged (e.g., remain below the threshold), yet the valve is adjusted responsive to transient conditions and/or exhaust over-pressure conditions.

Map 700 of FIG. 7 illustrates the effect of exhaust pressure peaks on the exhaust valve. Plot 702 represents an exhaust pressure curve at high engine load when the volume control valve is closed, plot 704 depicts an exhaust pressure curve at high engine load when the volume control valve is open, plot 706 is an exhaust pressure curve at low engine load and plot 708 illustrates the movement of an exhaust valve as exhaust pressure goes beyond a threshold. All plots are depicted over time, plotted along the x-axis.

At t1, t2 and t4 with the volume control valve in closed position and the engine operating under a heavy load (plot 702), the exhaust valve can be forced open due to high exhaust pressure (plot 708) in the manifold. At t3, the valve is not forced open because the exhaust pressure pulse remains below the threshold pressure. Plot 704 illustrates that at high engine loads and with the volume control valve open, the average pressure may remain the same as with the volume control valve closed. The important difference between plots 702 and 704 is the decrease in the amplitude of the pressure pulse which leaves the exhaust valves in their closed position. With the engine operating at a low load, the exhaust pressure curve never reaches the threshold (plot 706) and does not affect the position of the exhaust valves.

Now turning to FIG. 5, an example routine 500 is shown for adjusting a timing of a volume control valve adjustment based on an engine transmission event to reduce the impact, if any, of a torque disturbance associated with the volume control valve adjustment. The routine allows such a torque disturbance to be better masked, improving the quality of the vehicle operator's drive experience.

At 502, the routine includes determining the volume control valve adjustment requested. For example, the controller may determine whether the valve is to be moved to an open position or to a closed position. As previously elaborated, the volume control valve can be closed to allow faster engine spooling under a tip-in condition when boost pressure has been determined to be low or the volume control valve could be opened to decrease the exhaust pressure pulse when exhaust pressure is very high.

At 504, a torque change associated with the upcoming volume control valve adjustment is determined. As such, the torque change may include a torque disturbance. For example, at moderate to high boost flow and high exhaust pressure, when the volume control valve is opened, the exhaust manifold pressure decreases, causing more fresh air to be trapped in the cylinders. If this increase in airflow is matched by fuel to maintain constant air-fuel ratio and ignition timing, the opening of the volume control valve produces a "bump" up in engine torque, herein also referred to as a torque bump or torque surge. In a similar fashion, if the engine is at a moderate to high airflow, and the volume control valve is closed to help spool up the turbine, the elevated exhaust manifold pressure will cause the trapped aircharge to suddenly decrease, while also reducing further fresh air flow into the engine. If this decrease in airflow is matched by fuel to maintain constant air-fuel ratio and ignition timing, the closing of the volume control valve produces a "bump" down in engine torque, herein also referred to as a torque bump or torque dip. In either case, the torque disturbance, or torque bump, leads to poor drivability. As elaborated below, an engine controller may be configured to adjust an engine actuator during the volume control valve transition to maintain engine torque and reduce the impact of the torque bump.

At 506, it may be determined if a torque bump is expected. Specifically, based on the estimation of a torque change associated with the expected volume control valve adjustment, it may be determined if a torque surge or torque dip is expected. In one example, a torque surge may be confirmed if the torque change associated with the scheduled volume control valve adjustment is a positive change that is more than a threshold amount. In another example, a torque dip may be confirmed if the torque change associated with the scheduled volume control valve adjustment is a negative change that is more than a threshold amount.

If a torque bump is not expected, then at 508, the routine includes maintaining the position of one or more engine actuators. Further, the volume control valve adjustment is performed as determined (e.g., at a timing based on the estimated operating conditions).

If a torque bump is expected, then at 510, it may be ascertained if there is an upcoming transmission shift event that will include slipping clutches between the engine and the wheels. The controller may determine if there is an upcoming transmission event based on the shift schedule of the transmission. The upcoming transmission event may include an upcoming transmission upshift event or an upcoming transmission downshift event. As such, the engine transmission may include a manual transmission or an automatic transmission. The transmission may further include one or more clutches such as a torque converter clutch, and a forward clutch. The one or more clutches may include a mechanical clutch that is mechanically actuated, as well as an "e-clutch" that is electronically actuated (that is, a clutch-by-wire).

In some embodiments, in determining if there is an upcoming transmission event, the controller may determine a duration between the upcoming transmission event (based on a shift schedule of the transmission) and a time when a request for transitioning restriction at the volume control valve is received. If the duration is sufficiently long (e.g., longer than a threshold duration), an upcoming transmission event may not be confirmed. If the duration is sufficiently short (e.g., shorter than a threshold duration), an upcoming transmission event may be confirmed.

If an upcoming transmission event is confirmed, then at 512, the routine includes adjusting a timing of the transitioning based on a transmission event. The adjusting may include, in response to an upcoming transmission event, timing the transitioning to at least partially overlap the transmission event. For example, if a duration between the transmission event and a request for transitioning restriction is smaller than a threshold, the timing of the volume control valve transitioning may be adjusted to be during the transmission event (e.g., concurrent with the transmission event). In another example, the timing may be adjusted so that the timing of the transitioning immediately follows the transmission event. By timing the transitioning to at least partially overlap the transmission event, the impact of the torque bump can be better masked, thereby improving driveability.

If an upcoming transmission event is not confirmed at 510, for example, if the duration between the transmission event and the request for transitioning restriction is larger than the threshold, at 514, the routine includes performing the volume control valve adjustment as scheduled. This may include timing the transitioning to be before any (subsequent) transmission event.

The routine now proceeds to 516 to adjust an engine actuator during the volume control valve transition to maintain engine torque and reduce the impact of a torque bump that would have been experienced during the transition. The engine actuator adjusted may include one or more of VCT, spark timing, fuel mass/timing, EGR, intake throttle position, wastegate, and transmission shift schedule. In each case, the engine actuator adjustment may be based on the movement of the volume control valve.

As an example, when the volume control valve is closed, an engine actuator may be adjusted to transiently increase engine air flow. This transient increase in engine air flow may compensate for the transient drop in air flow experienced when the valve is closed and the exhaust manifold pressure is increased. As another example, when the volume control valve is opened, the engine actuator may be adjusted to transiently decrease engine air flow. This transient decrease in engine air flow may compensate for the transient rise in air flow experienced when the valve is opened and the exhaust manifold pressure is decreased. As one example, when the volume control valve is closed, the intake throttle opening may be temporarily increased to transiently increase the engine air flow while when the volume control valve is opened, the intake throttle opening may be temporarily decreased to transiently decrease the engine air flow.

In this way, the controlled volume may be advantageously used to mitigate the untimely opening of exhaust valves due to high exhaust pressure while allowing for conditions requiring improved boost. By closing the valve during transient conditions, increased manifold pressure can be used to accelerate turbine spin-up and reduce turbo lag. When the boost demand is met and exhaust pressure is projected to exceed the capability of an exhaust valve to remain closed, the volume control valve is opened to reduce power losses. By using one or more engine actuators to compensate for the torque impact of the volume control valve adjustment, the torque impact felt by a vehicle operator is reduced. In addition, by adjusting the timing based on a transmission event, the torque impact is better masked. Overall, engine performance and boost response is improved, exhaust emissions are reduced, and vehicle driveability is improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to an operator tip-in and boost pressure less than a threshold, closing a volume control valve that is coupled only upstream of a turbine to a volume on a split exhaust manifold of an engine until the boost pressure reaches the threshold, the volume being an enclosed chamber; and
responsive to boost pressure reaching the threshold, adjusting the volume control valve based on one or more of engine speed and exhaust pressure.

2. The method of claim 1 further comprising opening the volume control valve from closed responsive to exhaust pressure greater than an exhaust pressure threshold, wherein the volume control valve is adjusted via an actuator positioned opposite the volume control valve across a combined exhaust passage and coupled to the volume control valve via a rod passing therebetween.

3. The method of claim 2 wherein the volume control valve is closed responsive to the operator tip-in, even if exhaust pressure is greater than the exhaust pressure threshold.

4. The method of claim 1 wherein the volume control valve is opened above a threshold engine speed, and closed below the threshold engine speed, except that even if engine speed is above the threshold engine speed, the volume control valve is temporarily closed responsive to the operator tip-in, and even if engine speed is below the threshold engine speed, the volume control valve is opened responsive to exhaust pressure above a threshold pressure.

5. The method of claim 1 wherein the engine has only a single volume control valve on only one split of the exhaust manifold, another split having no volume or volume control valve.

6. The method of claim 1 further comprising opening the volume control valve or maintaining the volume control valve in an open position responsive to the operator tip-in if the boost pressure is higher than the threshold and the exhaust pressure is higher than an exhaust pressure threshold.

7. The method of claim 1 further comprising adjusting a turbocharger wastegate responsive to the closing, and closing the volume control valve during engine starting and stopping.

8. A method, comprising:
opening or closing a volume control valve on a split exhaust manifold of an engine based on engine speed;
if the volume control valve is open, temporarily closing the volume control valve during a transient condition; and
if the volume control valve is closed, temporarily opening the volume control valve responsive to an over-pressure condition.

9. The method of claim 8 wherein the over-pressure condition includes exhaust pressure greater than an upper threshold.

10. The method of claim 8 wherein the transient condition includes an operator tip-in.

11. The method of claim 10 wherein the split exhaust manifold is formed by two exhaust passages that are maintained separated prior to merging upstream of a turbine inlet.

12. The method of claim 11 wherein the volume control valve is positioned external to a cylinder head and coupled to one of the external exhaust passages.

13. The method of claim 8, wherein the volume control valve is further adjusted responsive to engine starting conditions, deceleration fuel shut-off operation, and an indication of engine knocking.

14. A system, comprising:
an engine with a split exhaust manifold leading to a turbine, the engine including a plurality of cylinders;
a valve coupled to a volume, the volume exclusively communicating with a subset of the plurality of cylinders through the split exhaust manifold; and
a controller with instructions in non-transitory memory and executable by a processor to: during a first operator tip-in from idle, maintain the valve closed until after boost reaches a threshold; and during a second operator tip-in from idle, temporarily close the valve; and adjust the valve responsive to engine speed during steady-state conditions.

15. The system of claim 14 wherein cylinder exhaust valves are cam-actuated, and wherein the valve is coupled to an actuator via a rod, the actuator positioned through a passage in an exhaust pipe, the passage not communicating with any exhaust gas.

16. The system of claim 15 wherein the first operator tip-in is indicated via a pedal position increase greater than a threshold from an idle position.

17. The system of claim 16 further comprising a low-pressure exhaust gas recirculation system with an exhaust gas recirculation valve.

18. The system of claim 17 wherein the controller further includes instructions to adjust the exhaust gas recirculation valve responsive to temporarily closing the valve.

* * * * *